(12) United States Patent
Cakmak

(10) Patent No.: US 10,192,454 B2
(45) Date of Patent: Jan. 29, 2019

(54) APPARATUS FOR ACCOMMODATING A PERSON AND FOR PARTIALLY LIMITING THE FREEDOM OF MOVEMENT OF THE PERSON

(71) Applicant: Tuncay Cakmak, Herzogenburg (AT)

(72) Inventor: Tuncay Cakmak, Herzogenburg (AT)

( * ) Notice: Subject to any disclaimer, the term of this patent is extended or adjusted under 35 U.S.C. 154(b) by 417 days.

(21) Appl. No.: 14/776,409

(22) PCT Filed: Apr. 3, 2014

(86) PCT No.: PCT/EP2014/056728
§ 371 (c)(1),
(2) Date: Sep. 14, 2015

(87) PCT Pub. No.: WO2014/166814
PCT Pub. Date: Oct. 16, 2014

(65) Prior Publication Data
US 2016/0035228 A1    Feb. 4, 2016

(30) Foreign Application Priority Data

Apr. 10, 2013  (AT) .................................. A 272/2013

(51) Int. Cl.
*G09B 9/00* (2006.01)
*G09B 5/00* (2006.01)
(Continued)

(52) U.S. Cl.
CPC ............... *G09B 5/00* (2013.01); *A61H 3/008* (2013.01); *A63B 5/00* (2013.01); *A63B 21/4009* (2015.10);
(Continued)

(58) Field of Classification Search
USPC .......... 434/34, 55, 247; 472/59, 60, 61, 130; 463/30, 31, 34, 36; 482/51, 54
See application file for complete search history.

(56) References Cited

U.S. PATENT DOCUMENTS

| 5,372,561 A | 12/1994 | Lynch |
| 5,702,307 A | 12/1997 | Moran |

(Continued)

FOREIGN PATENT DOCUMENTS

| CN | 101443083 A | 5/2009 |
| CN | 201871178 U | 6/2011 |

(Continued)

OTHER PUBLICATIONS

International Search Report of PCT/EP2014/056728, dated Jul. 17, 2014.
(Continued)

*Primary Examiner* — Kurt Fernstrom
(74) *Attorney, Agent, or Firm* — Collard & Roe, P.C.

(57) ABSTRACT

The invention relates to an apparatus (100) for accommodating at least one person (25) and for partially limiting the freedom of movement of the person (25) accommodated in the apparatus (100), comprising a platform (7a) and a first annular part (13) arranged above the platform (7a) for surrounding the at least one person (25), wherein the annular part (13) is rotatable in relation to the platform (7a), wherein the annular part (13) can be moved up and down in relation to the platform (7a).

38 Claims, 16 Drawing Sheets

(51) Int. Cl.

| | | |
|---|---|---|
| *A61H 3/00* | (2006.01) | |
| *A63F 13/245* | (2014.01) | |
| *A63F 13/42* | (2014.01) | |
| *A63F 13/214* | (2014.01) | |
| *A63B 71/06* | (2006.01) | |
| *A63B 5/00* | (2006.01) | |
| *A63B 22/20* | (2006.01) | |
| *A63B 23/04* | (2006.01) | |
| *A63B 21/00* | (2006.01) | |
| *A63B 24/00* | (2006.01) | |
| *F41G 3/26* | (2006.01) | |
| *A63B 69/00* | (2006.01) | |
| *A61H 1/00* | (2006.01) | |
| *A63B 71/00* | (2006.01) | |

(52) U.S. Cl.
CPC .......... *A63B 22/20* (2013.01); *A63B 23/0464* (2013.01); *A63B 24/00* (2013.01); *A63B 69/00* (2013.01); *A63B 69/0057* (2013.01); *A63B 69/0064* (2013.01); *A63B 71/0622* (2013.01); *A63F 13/214* (2014.09); *A63F 13/245* (2014.09); *A63F 13/42* (2014.09); *F41G 3/26* (2013.01); *A61H 1/005* (2013.01); *A61H 2201/163* (2013.01); *A61H 2201/5064* (2013.01); *A61H 2201/5069* (2013.01); *A61H 2201/5092* (2013.01); *A63B 69/004* (2013.01); *A63B 69/0028* (2013.01); *A63B 2071/0072* (2013.01); *A63B 2071/0638* (2013.01); *A63B 2071/0666* (2013.01); *A63B 2208/0204* (2013.01); *A63B 2220/16* (2013.01); *A63B 2220/70* (2013.01); *A63B 2220/76* (2013.01); *A63B 2220/805* (2013.01); *A63B 2220/89* (2013.01); *G06F 2203/012* (2013.01)

(56) References Cited

U.S. PATENT DOCUMENTS

| | | | | |
|---|---|---|---|---|
| 5,759,107 | A * | 6/1998 | Nagel | A63G 31/16 |
| | | | | 434/55 |
| 5,792,031 | A * | 8/1998 | Alton | A63B 69/0059 |
| | | | | 482/78 |
| 6,135,928 | A | 10/2000 | Butterfield | |
| 6,152,854 | A * | 11/2000 | Carmein | A63B 22/025 |
| | | | | 198/779 |
| 6,270,414 | B2 * | 8/2001 | Roelofs | G06F 3/011 |
| | | | | 345/156 |
| 7,470,218 | B2 | 12/2008 | Williams | |
| 7,780,573 | B1 * | 8/2010 | Carmein | A63B 22/0242 |
| | | | | 482/4 |
| 9,056,240 | B2 * | 6/2015 | Carrell | A63C 17/061 |
| 9,329,681 | B2 * | 5/2016 | Goetgeluk | G06F 3/011 |
| D766,239 | S * | 9/2016 | Goetgeluk | D14/356 |
| 9,766,696 | B1 * | 9/2017 | Fung | G06F 3/011 |
| 2005/0209072 | A1 | 9/2005 | Sheron | |
| 2009/0111670 | A1 * | 4/2009 | Williams | A63B 23/0464 |
| | | | | 482/146 |
| 2010/0267533 | A1 | 10/2010 | Susnjara | |
| 2011/0160024 | A1 | 6/2011 | Candela et al. | |
| 2013/0157227 | A1 * | 6/2013 | Jansen | G09B 9/14 |
| | | | | 434/30 |

FOREIGN PATENT DOCUMENTS

| | | |
|---|---|---|
| DE | 103 61 417 B3 | 3/2005 |
| GB | 2 312 273 A | 10/1997 |
| WO | 99/35559 A2 | 7/1999 |
| WO | 02/059853 A2 | 8/2002 |
| WO | 2007/064456 A2 | 6/2007 |

OTHER PUBLICATIONS

Benjamin Gruendken: "Virtuix Omni macht Beine zum Controller—Massentauglicher Virtual-Reality-Device dank Kickstarter?". Mar. 2, 2013 (Mar. 2, 2013), XP055126983, Retrieved from the Internet: URL:http://www.pcgameshardware.de/Kickstarter-Event-239378/News/Virtuix-Omni-Beine-ontroller-Virtual-Reality-Device-Kickstarter-1058541/[retrieved on Jul. 4, 2014].

"Cyberith—Virtualizer Gets Tested at the GAMESCOM 2013 Hall 10.1", Aug. 23, 2013 (Aug. 23, 2013), XP054975441, Retrieved from the Internet: URL:https://www.youtube.com/watch?v=OE60_0UW8Xg [retrieved on Jul. 3, 2014].

Tunkay Cakmak, "New device to revolutionize gaming in virtual realities (w/Video)", Phys.org, Vienna University of Technology search and more info website, Sep. 24, 2013.

"Oculus Rift creator to back Omni Kickstarter campaign", Apr. 4, 2013, retrieved from Internet at http://www.3dfocus.co.uk/3d-news-2/oculus-rift-creator-to-back-omni-kickstarter-campaign/12746 on Nov. 19, 2013 (no longer available at that link).

Austrian Office Action dated Nov. 20, 2013 from Austrian Patent Application A 272/2013.

Chinese Office Action dated Jan. 19, 2017 in Chinese Application No. 201480026626.8 with English translation.

* cited by examiner

APPARATUS FOR ACCOMMODATING A PERSON AND FOR PARTIALLY LIMITING THE FREEDOM OF MOVEMENT OF THE PERSON

CROSS REFERENCE TO RELATED APPLICATIONS

This application is the National Stage of PCT/EP2014/056728 filed on Apr. 3, 2014, which claims priority under 35 U.S.C. § 119 of Austrian Application No. A 272/2013 filed on Apr. 10, 2013, the disclosures of which are incorporated by reference. The international application under PCT article 21(2) was not published in English.

BACKGROUND OF THE INVENTION

The invention relates to an apparatus for accommodating at least one person and for partially limiting the freedom of movement of the person accommodated in the apparatus, comprising a platform and a first annular part arranged above the platform for surrounding the at least one person, wherein the annular part is indirectly connected to the platform and is rotatable relative to the platform, wherein the first annular part can be moved up and down in relation to the platform, wherein further the apparatus comprises a second annular part, wherein the plane formed by the first annular part and the plane formed by the second annular part stand substantially parallel with respect to each other, and the first annular part is arranged within the second annular part and is rotatably mounted thereon about a rotational axis which stands substantially normal to the plane formed by the first annular part, wherein further a rod assembly is fastened to the second annular part at least at one point, which rod assembly extends downwardly in an inclined manner in relation to the plane formed by the second annular part. The invention relates especially to locomotion apparatuses, movement apparatuses, (reality) simulation apparatuses, training and/or sports apparatuses.

DESCRIPTION OF THE PRIOR ART

Such apparatuses are also known under the name of "locomotion devices" and are used especially in conjunction with a "head mounted display" as a simulation device, sports device or entertainment device. Such an apparatus can also be used for virtual "sightseeing" if the respective virtual environment is available. If a type of controller is additionally held, "shooter games" can be played without having to use a mouse or a keyboard. It is even possible by suitable software to decouple the direction of view, the direction of shooting and the direction of movement and to thus make gaming even more real.

WO2002059853A2 discloses a reality simulation system with a movement cage and a movement ring surrounding the user, which ring has a rotational degree of freedom with respect to the movement cage. The user is coupled to the movement ring via relatively long, resilient fixing springs which are attached to a belt carried by the user. As a result of the large diameter and the long fixing springs, such a construction requires a relatively large amount of space which is not available especially in the private sphere. Furthermore, the fixing springs are expensive and susceptible to wear and tear. A limitation in the degree of freedom is not provided to the extent which is desired for many applications since the fixing springs provide a large amount of play in all directions.

An apparatus is described in DE10361417B3 which consists of a hollow sphere which is mounted on rollers and in which one can move in that said hollow sphere is made to rotate. The rotation of the sphere is detected by sensors and transmitted to a computer. Said computer calculates the rotational values and converts the movement of the user into the movement of a virtual character. Movement through virtual spaces can thus occur. Said hollow sphere must have a diameter which is greater than the body size of the person who wishes to use the device. Since the hollow sphere also comes with inertia, abrupt stopping in the device is only possible within limits.

An apparatus is known from U.S. Pat. No. 7,470,218 which consists of a curved base platform on which the sliding movement is performed with special shoes. Said sliding movements are not similar to natural walking movements and the movement of the forward movement is equal to the backward movement, so that the device will thus not recognise the direction in which one wishes to move.

Further constructions departing from the present invention are disclosed in the following specifications: U.S. Pat. No. 6,135,928 A, U.S. Pat. No. 5,372,561A, GB2312273A, U.S. Pat. No. 5,702,307A, DE10361417B3 and CN201871178U.

A construction with an inner annular part is known from WO 99/35559 A2, which is rotatably mounted on an outer annular part, wherein the user is situated within the inner annular part when using the construction. A change in the vertical position of the annular part is possible by means of levers.

OBJECT OF THE INVENTION

It is therefore the object of the present invention to provide an apparatus which does not have the disadvantages of known simulation and movement apparatuses and which allows the person moving in the apparatus the greatest possible freedom of movement, despite partial limitation in the freedom of movement. Such an apparatus is to be realised by compact design and simple construction. A reliable and defined attachment of the person to the apparatus shall be ensured while simultaneously minimising the risk of injury.

SUMMARY OF THE INVENTION

This object is achieved by an apparatus of the kind mentioned above in such away that the annular part can be moved up and down in relation to the platform.

In addition to the rotational degree of freedom, the annular part is provided with a translatory degree of freedom, thus expanding the possibilities of application due to increased freedom of movement especially in the vertical direction and simultaneously enabling a compact design. The first annular part rotates together with the person, i.e. the rotational movements of the person are transmitted to the annular part. The annular part is dimensionally stable, i.e. it is especially made of a rigid material such as metal or hard plastic, thus providing the required stability. The annular part is preferably a continuous ring. A ring that is interrupted at one point can also be considered, e.g. an annular brace. The first annular part is formed to surround the torso of a body and is therefore used for coupling the person to the apparatus.

The first annular part is indirectly connected or linked to the platform and can be moved up and down in relation to said platform, so that also the vertical movements of the person, especially when standing up and jumping, can be transmitted to the annular part.

The apparatus preferably comprises a second annular part, wherein the plane formed by the first annular part and the plane formed by the second annular part stand substantially parallel with respect to each other, and the first annular part is arranged within the second annular part and is rotatably mounted thereon about a rotational axis which stands substantially normal to the plane formed by the first annular part. In this embodiment, the first (inner) annular part is rotatably mounted in the second (outer) annular part. As a result, the rotational degree of freedom of the first annular part in relation to the platform is achieved in a reliable, simple and compact manner. This means that the second (outer) annular part surrounds the first (inner) annular part and is thus used as a bearing or direct retainer for the first (inner) annular part. The second (outer) annular part is also dimensionally stable, i.e. it is especially formed from a rigid material such as metal or hard plastic, thus providing the required stability. The first (inner) annular part is preferably held axially by the second (outer) annular part, so that a mutual displacement of the two annular parts in the direction parallel to the rotational axis is blocked. The two annular parts can be moved up and down together in relation to the platform.

The second annular part is preferably torque-proof relative to the platform, thus producing clearly defined degrees of freedom for the first annular part relative to the platform. These degrees of freedom are preferably a rotation about a rotational axis and a translatory movement substantially parallel to the rotational axis, wherein all other degrees of freedom are blocked.

The annular part is preferably rotatable in relation to the platform about a rotational axis which stands substantially normal to the plane formed by the annular part, thus enabling rotations of persons about their body axis when the ring or first annular part surrounds the torso of the body.

The plane formed by the annular part preferably stands substantially parallel to the surface of the platform, or the angle or potential change of angle between these planes is 45° at most, preferably 30° at most, more preferably 15° at most. The apparatus can therefore be used when standing, which is desirable in sports training and in most physical reality games. Furthermore, training on a plane inclined with respect to the annual plane is possible.

The annular part can preferably substantially be moved up and down in the vertical direction in relation to the platform, wherein preferably the annular part is connected to the platform via a substantially vertical guide. This degree of freedom especially allows jumping and crouching. A compact construction is ensured.

The first annular part is preferably fixed in relation to the platform with respect to a translatory movement in the horizontal direction, thus preventing spatial movement of the person in the horizontal direction. This embodiment is especially suitable when there is little available space.

The first annular part preferably comprises at least one attachment device for attaching the person to the first annular part. It can be formed as a hook for example or by a hole on the ring itself. The person can be attached through the attachment device by means of a belt, rope, band, chain or the like.

The apparatus preferably comprises a hip belt for attaching the person to the first annular part, wherein preferably the hip belt comprises at least one length-adjustable connecting strap which is connected to the first annular part, so that the connecting strap transmits the force produced by the movement of the person onto the first annular part. This represents an especially simple solution because hip belts are available on the market in all required sizes. Any suitable connecting means can be used instead of the connecting strap, e.g. a cable, a chain, a band and the like.

The (hip) belt can also be attached to the first annular part via telescopic rods in such a way that a translatory displacement of the user within the first annular part is enabled. Said displacement is directed to the front and the rear from the view of the user. Such a displacement of the user to the front to the rear within the first annular part ensures that a curved base can be used even though the users may have different body sizes. The telescopic rods are attached in such a way that there is no slippage during a rotational movement of the user. One possibility would be two telescopic rods for example.

Furthermore, the attachment of the (hip) belt for ensuring translatory displacement of the user can be realised via a rail system within the first annular part. The rails can be arranged to the left and right of the (hip) belt of the user and also allow slip-free rotation.

Furthermore, the attachment of the (hip) belt for ensuring a translatory displacement of the user can be realised via a rubber system within the first annular part. The rubber system would be connected to the (hip) belt and the annular part in such a way that after a specific displacement a retaining force which is generated by the rubber system and which is produced by the expansion of the rubber system is so great that the user does not touch the first annular part.

Alternatively, the first annular part forms a hip belt itself. In this case, the first annular part comprises a rigid, first part in order to enable the unequivocal determination of rotational movements or a rotational axis and upward and downward movements, especially in relation to the second annular part. Furthermore, the first annular part comprises a second, flexible part in this embodiment, which second flexible part allows an adjustment and fixing of the thus formed hip belt to the person. Accordingly, it is thus provided in a preferred embodiment of the apparatus in accordance with the invention that the first annular part comprises a first rigid part and a second flexible part, wherein the first part and the second part form a hip belt for the person.

The inner ring diameter of the first annular part is preferably at least 300 mm in order to enable the enclosure of the torso, especially the hip region and/or the breast region of a person.

The inner ring diameter of the first annular part is preferably at most 800 mm, preferably at most 600 mm. This 600 mm. This upward limitation ensures that the required attachment between the person and the first annular part does not allow an excessive range of movement. It has been noticed that the most direct transmission of the movement of the person by short attachment to the annular part has an advantageous effect. Furthermore, this solution has an advantageous effect on the need for space.

The apparatus preferably comprises at least one sensor device for detection of the movement and/or the sequence of movement and/or the extent of movement of the person accommodated by the apparatus. The measured data recorded by the sensor device can be processed or evaluated and can be included in training software or a software for virtual games. The resulting feedback allows effective training or especially realistic "gaming" for example.

The apparatus preferably comprises an optical display, especially a monitor, a screen or video glasses, wherein the sensor signals recorded by the sensor device can be transmitted to a data-processing device, which communicates on its part with the optical display (in a cable-bound or wireless manner).

The outer ring consists in a preferred embodiment of two preferably identical hard plastic parts which provide space on the circumference for deflection rollers. Said deflection rollers are provided with a specific shape on the circumference such as a U-shape or a V-shape. On the outer circumference, the inner rotatable ring has a shape which corresponds to the deflection rollers. The inner rotatable ring (i.e. the first annular part) is installed together with the deflection rollers in the outer ring (i.e. the second annular part). As a result of the shape of the deflection rollers, axial movement of the inner ring to the outer one is blocked, but rotation is still guaranteed. It is accordingly provided in a preferred embodiment of the apparatus in accordance with the invention that deflection rollers are arranged on the second annular part, wherein the deflection rollers and the first annular part are formed with respect to each other in such a way that the first annular part is rotatably mounted in relation to the second annular part by means of the deflection rollers and is simultaneously retained axially.

In an alternative embodiment, an annular disc extends at least along the upper side of the first annular part, and a bearing, preferably a roller bearing, is situated in the cavity formed between the annular parts and the annular disc. The disc prevents soiling of the bearing, reduces the risk of injury and blocks axial displacement between the annular parts at least in one direction.

An annular disc preferably extends along the bottom side of the annular part, which annular disc limits the cavity together with the annular disc which extends along the upper side of the first annular part. The bearing is thus protected even better and can prevent axial displacement between the annular parts also in the other direction.

The annular disc is preferably rigidly connected to the first annual apart.

The bearing preferably comprises several roller bearings, wherein
- at least one roller bearing is attached to the inner side of the second annular part in such a way that the axis of the roller bearing stands substantially parallel to the axis of the annular parts, and the roller bearing touches the exterior side of the first annular part, and
- at least one roller bearing is attached to the inner side of the second annular part in such a way that the axis of the roller bearing stands substantially radially perpendicular to the axis of the annular parts, and the roller bearing touches the bottom side of the annular disc which extends along the upper side of the first annular part.

As a result, the first (inner) part of the ring construction cannot move axially in relation to the second (outer) part. A gap is preferably formed between the annular disc and the second (outer) annular part (as seen in the direction of the rotational axis).

Preferably, the at least one roller bearing is attached to the inner side of the second annular part in such away that the axis of the roller bearing stands substantially radially perpendicularly to the axis of the annular parts, and the roller bearing touches the upper side of the annular disc which extends along the bottom side of the first annular part. As a result, the first (inner) part of the ring construction cannot move axially in relation to the second (outer) part. A gap is preferably formed between the annular disc and the second (outer) annular part (as seen in the direction of the rotational axis).

A spiral with a winding is preferably attached to the bottom side of the annular disc, which spiral has a diameter which is substantially as large as the diameter of the second annular part.

A rod assembly is preferably fastened to the second annular part at least at one point, which rod assembly extends downwardly in an inclined manner in relation to the plane formed by the second annular part and comprises a guide structure, preferably a tube retainer, at its outer end, which is guided in a elongated guide, preferably a steel tube. The guide structure can be a block which is guided within an elongated guide with special cross-section, especially within a guide profile, preferably within an aluminium profile. The block can comprise rollers, preferably such that are mounted in ball bearings, in order to ensure the most friction-free movement in the elongated guide. The cross-section of the aluminium profile is selected in such a way that a compact construction is possible. The guide structure, to which preferably several ball bearings are attached, moves up and down within the profile. The ball bearings are preferably attached in such a way that torques can be absorbed in several axes.

The elongated guide or the guide profile is preferably formed in such a way that a deflection roller can be mounted and a spring or rubber element can be connected to the guide structure. A channel is present in the profile for the spring or rubber element and a channel for the ball bearing which can absorb torques in the direction of the axis of said ball bearing.

The elongated guide or the guide profile preferably comprises holes which are suitable for accommodating a pin. Said pin can be made of hard plastic or metal, and a blocking means is in connection with the holes, i.e. it is used to block the vertical movement, especially the vertical downward movement of the ring construction. This blockage produces a safety function for beginners because they are thus unable to fall to the ground. Furthermore, the blockage, especially for experienced users, offers the possibility of a sitting function in order to relax for example.

The blockage of the vertical movement of the ring construction can also be realised by other blocking means, especially via electronic/triggerable modules which are either attached to the connecting arms of the ring construction or defined places on the elongated guide or guide profiles. These modules can be triggered via cable or also via radio. The modules can comprise servomotors, linear motors, magnetic or pneumatic motors. As a result, a blockage can be activated or deactivated only when a specific action has occurred in the virtual environment such as entering a vehicle for example.

That is why it is provided in a preferred embodiment of the apparatus in accordance with the invention that at least one blocking means is provided in order to block a movement of the guide structure in the elongated guide.

The spring or rubber elements are fastened in the channel of the guide profile by means of fastening elements which can preferably be screwed together. The fastening elements can be attached to different positions in order to thus vary the tension of the spring or rubber elements. The spring or rubber elements are used for compensating the weight of the ring construction.

A construction of a safety belt can also be installed in said guide profiles, which safety belt catches the untrained user in the case of a rapid downward movement.

Housings made of plastic can be mounted above the guide profiles, which housings are precisely adjusted to the cross-section in order to ensure a visually appealing appearance.

A rod assembly can be mounted on the guide profiles or the housing, which rod assembly is used to guide a cable of video glasses. The rod assembly can comprise a bend, so that it lies above the centre of the apparatus with its upper end.

Retainers can be mounted on the rod assembly, which are used to mount other devices such as cameras for example.

The guide structure of the rod assembly preferably comprises a slide bushing which surrounds the elongated guide, wherein the guide is formed as a substantially perpendicular, upwardly standing tube that is fixed to the platform.

The tube is preferably inserted into a sleeve with a base frame welded thereon and preferably screwed together.

The platform is preferably formed on a base frame, which is formed of square, equally long shaped tubes made of steel, which are welded onto each other in squares, wherein shaped tubes are additionally situated in the centre of the square base frame, which are arranged in the manner of a cross and are centrally welded onto the inner side of the square base frame, and additional, equally long shaped tubes are preferably screwed centrally onto the exterior side of the shaped tubes of the square base frame, wherein all upper sides of the shaped tubes of the base frame form a flat plane.

It is accordingly provided in a preferred embodiment of the apparatus in accordance with the invention that the platform is formed on a base frame which is formed by shaped tubes made of steel, wherein all upper sides of the shaped tubes of the base frame form a flat plane.

The platform is preferably formed by a plate sprayed by a PTFE spray, preferably a stainless steel plate, wherein preferably the plate is screwed onto a base frame.

In order to achieve good sliding behaviour with a low friction coefficient, especially a low sliding friction coefficient $\mu_G$, a plastic plate can be provided on which the person stands and moves. Said plastic plate is attached to a steel plate for reinforcing purposes. Highly molecular polyethylene (PE-HMW) such as PE500, and/or high-density polyethylene (PE-HD) are especially suitable for this purpose as plastic materials. That is why it is provided in a preferred embodiment of the apparatus in accordance with the invention that the platform is formed by a steel plate and a plastic plate situated above said that steel plate, which plastic plate is preferably made of PE-HMW or PE-HD, wherein preferably the steel plate is screwed onto a base frame and the plastic plate is connected to the steel plate, preferably screwed or glued onto said plate.

The platform preferably comprises holes for the passage of light beams of optical sensors.

The apparatus preferably comprises footgear or textile footgear for the person accommodated by the apparatus, which footgear shows a low friction coefficient, especially a low sliding friction coefficient, in interaction with the platform. This means that $\mu_G \leq 0.07$ applies to the sliding friction coefficient, especially $0.01 \leq \mu_G \leq 0.02$.

The friction coefficient between the footgear or the textile footgear and the platform is adjusted in such a way that the person needs to apply little force for the movements, but a rotational movement of the person still remains a possibility.

The sensor device preferably comprises at least one optical sensor which is arranged beneath the platform, wherein preferably the optical sensor is a computer mouse which faces upwardly with its bottom side. The optical sensors of the computer mice are also known as laser gaming sensors.

The optical sensors of the sensor device are arranged in such a way, preferably in form of a hexagon, that each movement of the foot of the person can be recognised in each rotational direction by at least one optical sensor, and the sensor signal is preferably transmitted to a microcontroller, especially preferably via a USB hub or a USB host shield.

The sensor device preferably comprises optical or acoustic distance sensors which are arranged in the region of the platform and are formed to measure the height of the annular parts and/or the rotational angle of the first annular part relative to the second annular part.

The sensor device preferably comprises distance sensors, preferably optical or acoustic ones, which are arranged in the region of the guide and are formed to measure the height of the annular parts.

The sensor device comprises preferably optical sensors which are arranged in the region of the second annular part and are formed to measure the rotational direction and the rotational angle of the first annular part. This preferably occurs via a special colour pattern or colour coding on the inner ring or the first annular part. Magnetic sensors can also be used for the measurement of the rotational angle.

The sensors which measure the rotational angle can preferably be attached to a separate module which is indirectly fastened to the first rotatable ring or first annular part, so that vertical fluctuations on the ring can be compensated, but rotation can still be ensured although the module is not co-rotated.

The apparatus for evaluating the sensor signals preferably comprises at least one microcontroller which is connected to the at least one sensor device, and preferably the apparatus comprises a data-processing device, especially a computer, which is connected to the microcontroller. As a result, the sensor data can be supplied to respective application software (training software, computer games) and can be considered by said software.

Preferably, the absolute angular measurement of the first annular part relative to the second annular part occurs by means of a spiral which is detected by a first sensor, and a measurement difference is formed between the sensor signal of the first sensor and the sensor signal of a second sensor which measures the height of the annular parts, so that the axial perpendicular movement of the annular parts does not influence said measurement.

In one development the invention relates to an apparatus for carrying out and recognising movements without spatial locomotion for virtual reality systems (also known as locomotion device), consisting of a rotatable and vertically movable ring construction which fixes a user via a base frame equipped with sensors.

One embodiment also relates to the fixing method of the user in relation to the inner ring (first annular part) of the ring construction, and absolute angular measuring method of the inner ring of the ring construction, a method for carrying out sliding movement on the base platform, and a measuring method for the sliding movements of the feet of the user.

The first annular part of the ring construction (inner ring) can preferably be rotated 360° about the vertical axis, and the entire ring construction can axially vertically be moved up and down within a specific range.

It was especially a fundamental object of the present invention to describe the necessary system components and their interaction with which said apparatus can be used as a sports appliance. Special focus was given to enabling sports in virtual environments.

The object is fundamentally important to allow a user to carry out specific movements permanently without moving in a row and to detect the type of the movement via sensors.

In order to reinforce the immersion in the virtual world, a vibration unit, which is also known as a bass shaker, can be installed beneath the base platform. Force feedback can thus be offered to the user. Furthermore, the base platform can be arranged on a spatial movement machine such as a hexapod or a 3D/6D movement platform. As a result, the base platform can be tilted according to the current virtual environment which is perceived by the user, so that the inclination of the base in the virtual environment is transmitted or transformed into an actual inclination of the base platform. That is why it is provided in a preferred embodiment of the apparatus in accordance with the invention that the apparatus comprises a vibration unit and/or a spatial movement machine, wherein the vibration unit and/or the spatial movement machine is preferably arranged on the platform.

It was another object to decrease the friction coefficient between the footgear and the base platform in such a way that the movements are possible without major input of force by the user, but rotational movement is also possible, which again requires at least a low amount of friction.

The general possibilities for movement are: walking forward, creeping forward, running forward, creeping to the side, walking to the side, running to the side, creeping backwards, walking backwards, running backwards, turning, crouching, jumping, and combinations of these movements.

A local movement is realised in that the belt prevents the user from moving away in space and his or her feet thus slide over the base platform equipped with sensors. The force which is required to thus obstruct the user is absorbed via the connecting belts, which are connected to the inner ring (first annular part) of the ring construction. The user wears special footgear on his or her feet, which in combination with the base platform has a very low frictional resistance.

It was also important to calculate the movements which are detected by the sensors directly in the apparatus and to transmit them to the driver software in the computer.

This is achieved by a microcontroller which processes the signals of the sensors.

It was a further object to find a possibility in order to detect the direction of movement of the hip of the user and to compare it with the direction of movement of the movements of the feet of the user.

In order to ensure that the direction of the hip can be detected in relation to a fixedly defined direction of the apparatus, it was necessary to find a method which absolutely measures the angle of the inner ring of the ring construction. It is also possible to measure the angle in a relative way and to thus calibrate the ring to a zero position.

This is preferably realised via an additional ring, which is radially cut on one side and is bent like a spiral. Said spiral is attached to the bottom of the rotatable inner ring of the ring construction and allows the assignment of a distance to each rotation by a distance measurement via a distance sensor which is fixedly mounted to a base frame. Each angle of the inner ring thus leads to a change in the distance between the spiral and the sensor. In this respect, the resolution capability of the sensor and the offset of the ends of the spiral are important. In order to ensure that the vertical movement of the entire ring construction does not influence this angular measurement, a second distance sensor, which only measures the height of the ring construction, ensures a correction of the measured value. This is achieved by forming the difference between the measured values of the two sensors.

The detection of the movement of the foot occurs via several computer mice which are attached in an upwardly facing manner to the bottom side of the base platform provided with small holes. The detection alternatively occurs via optical laser gaming sensors which are usually installed in a computer mouse. They are preferably arranged in form of a hexagon for the purpose of optimal detection of feet movement.

It was important to reduce the weight of the ring construction on the user. This is achieved in a preferred embodiment by a suitable friction on the slide bushings and the vertical sliding rods or elongated guides. By tightening the screw of the tube retainer, the force can be increased with which the slide bushing presses against the respective sliding rod.

The weight of the ring construction can be compensated in an alternative or additional manner by counterweights, spring elements or rubber elements. Weight compensation can be realised especially by a construction with deflection rollers.

The arms of the rod assembly with which the ring construction is connected to the guide are connected by means of cables to counterweights. Said counterweights can move up or down and are preferably connected to the upper and bottom side by cables. The cables are laid via deflection rollers which are fastened to the elongated guide or the guide profile.

The arms of the rod assembly are additionally or alternatively connected to rubber elements or spring elements which are fixed to the linear guides and can be guided via deflection rollers. The weight of the ring construction is thus compensated and a force can additionally be generated which is either upwardly directed in the case of high tension of the elements or downwardly directed in the case of low tension.

It is accordingly provided in a further embodiment of the apparatus in accordance with the invention that at least one compensation means is provided in order to compensate at least in part the weight which acts as a result of the construction of the apparatus on the first annular part, wherein the at least one compensation means preferably concerns a counterweight, a spring element or a rubber element.

Furthermore, it is provided in an especially preferred embodiment of the apparatus in accordance with the invention that the rod assembly is operatively connected by means of a cable to the at least one compensation means, wherein the cable is deflected via a deflection roller arranged on the elongated guide.

Elements such as cameras, fans, radiant heaters or air nozzles can be attached to the pillars or elongated guides in order to thus make the experience in the virtual environment even more real.

BRIEF DESCRIPTION OF THE DRAWINGS

The invention will be explained below in closer detail by reference to one embodiment of a number thereof. The drawings are exemplary and are used to illustrate the inventive concept, but shall not narrow said concept or represent the same in final manner, wherein.

DETAILED DESCRIPTION OF THE PREFERRED EMBODIMENT

Figure 1:
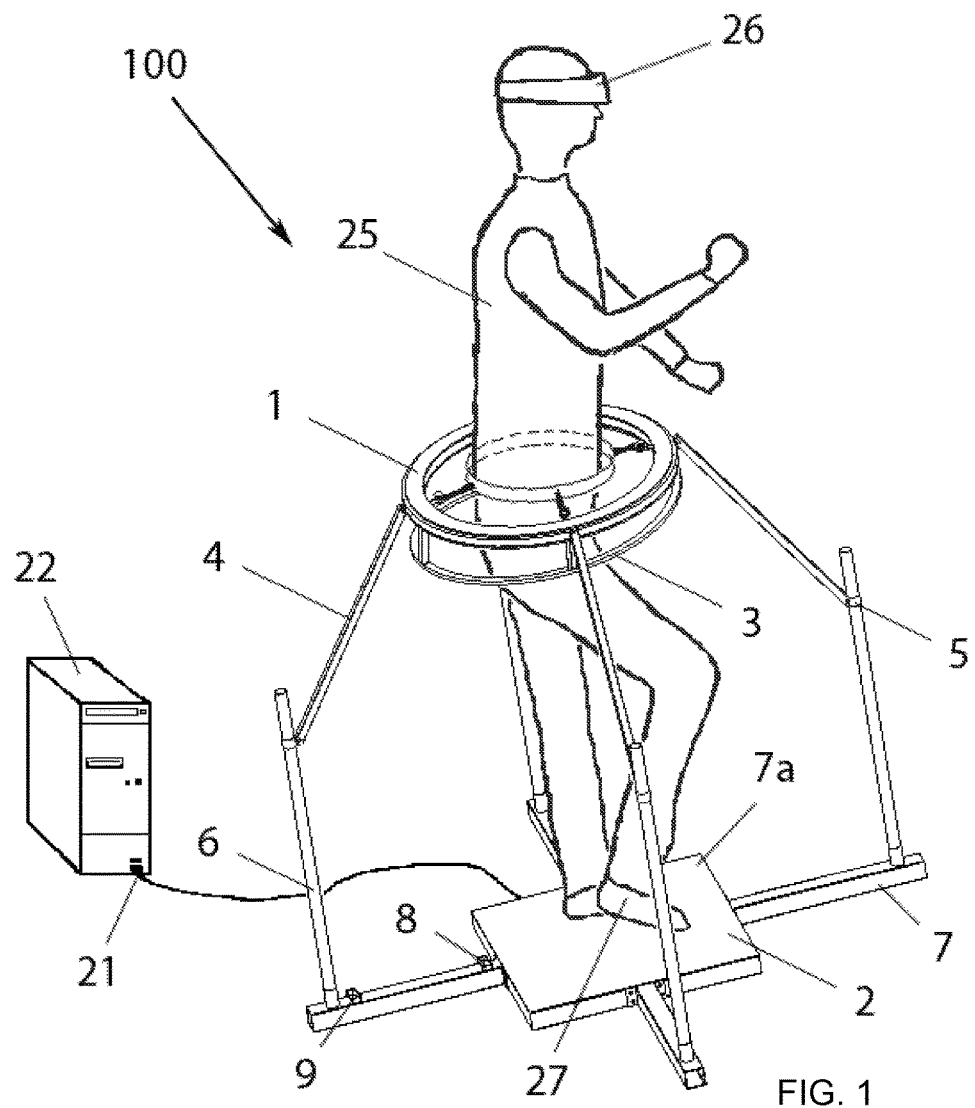
FIG. 1 shows an apparatus in accordance with the invention with a person accommodated therein.

FIG. 1 shows an apparatus 100 in accordance with the invention, which is formed as a training apparatus or (reality) simulation apparatus or movement apparatus for virtual games for example. The apparatus 100 is used for accommodating at least one person 25 and for partly limiting the freedom of movement of the person 25 accommodated in the apparatus 100, and comprises a platform 7a on which the person 25 stands, and a first annular part 13 or ring arranged above the platform 7a for surrounding the at least one person 25. The annular part 13 is rotatable relative to the platform 7a and can be moved up and down in relation to the platform 7a.

In the illustrated embodiment, the apparatus 100 comprises a second annular part 12, wherein the plane formed by the first annular part 13 and the plane formed by the second annular part 12 stand substantially parallel with respect to each other, and the first annular part 13 is arranged within the second annular part 12 and is rotatably mounted thereon about a rotational axis 13a which stands substantially normal to the plane formed by the first annular part 13. The second annular part 12 is substantially torque-proof relative to the platform 7a.

Figure 2:
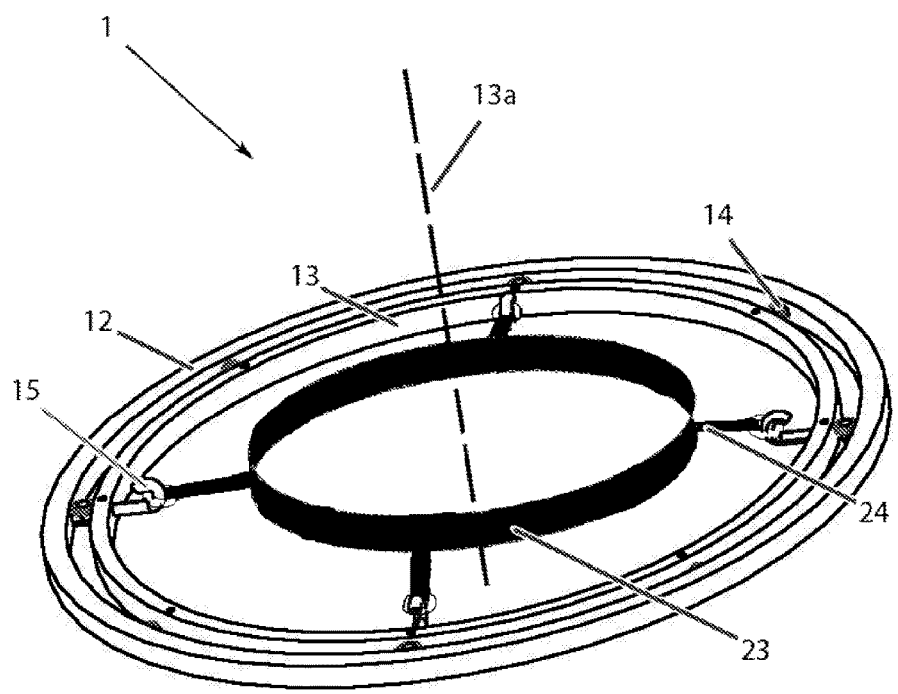
FIG. 2 shows the first annular part with a belt hooked thereon.

The first annular part 13 is rotatable about a rotational axis 13a relative to the platform 7a, which rotational axis stands substantially normal to the plane formed by the annular part 13 (FIG. 2). In the embodiment shown in FIG. 1, the plane formed by the first annular part 13 stands substantially parallel to the surface of the platform 7a.

The annular part 13 can be moved up and down substantially in the vertical direction in relation to the platform 7a, wherein the annular part 13 is connected to the platform 7a via a substantially vertical guide in form of sliding rods 6. The first annular part 13 is thus fixed in relation to the platform 7a with respect to a translatory movement in the horizontal direction.

The apparatus 100 comprises at least one sensor device (e.g. distance sensors 8, 9 and/or optical (motion) sensors in the region of the platform 7a and/or laterally positioned sensors) for the detection of the movement and/or movement sequence and/or movement range of the person 25 accommodated by the apparatus 100.

Furthermore, the following can be seen in the preferred embodiment of FIG. 1: the ring construction 1 with which the person 25 is fixed, the spiral 3 for measuring the angle of the first annular part 13 (inner ring) of the ring construction 1, the connecting rods or rod assemblies 4 which connect the ring construction 1 to the tube retainers 5, which on their part press the sliding bushings 16 against the vertical sliding rods 6, the base frame 7 to which the vertical sliding rods 6 are connected via a welded bushing or sleeve 17, the base plate 2 which is screwed onto the base frame 7 and forms the platform 7a on which a person moves, the optical distance sensor 8 which measures the height up to the spiral 3, the optical distance sensor 9 which measures the height of the ring construction 1 (e.g. in relation to the platform), the special shoes 27 which show low friction on the base plate 2, the USB cable 21 for connecting the apparatus to the computer 22, and a display 26 in form of a head mounted displays.

FIG. 2 shows the belt 23 connected to the rotatable inner ring 13 of the ring construction 1, which fixes the person 25 to the apparatus 100. The following items are emphasised: the belt 23 which is connected via the connecting belts 24 to the hook 15 of the inner ring 13, the ball bearings 14 which enable the rotation of the first annular part 13 (inner ring) within the second annular part 12 (outer ring).

Figure 3:
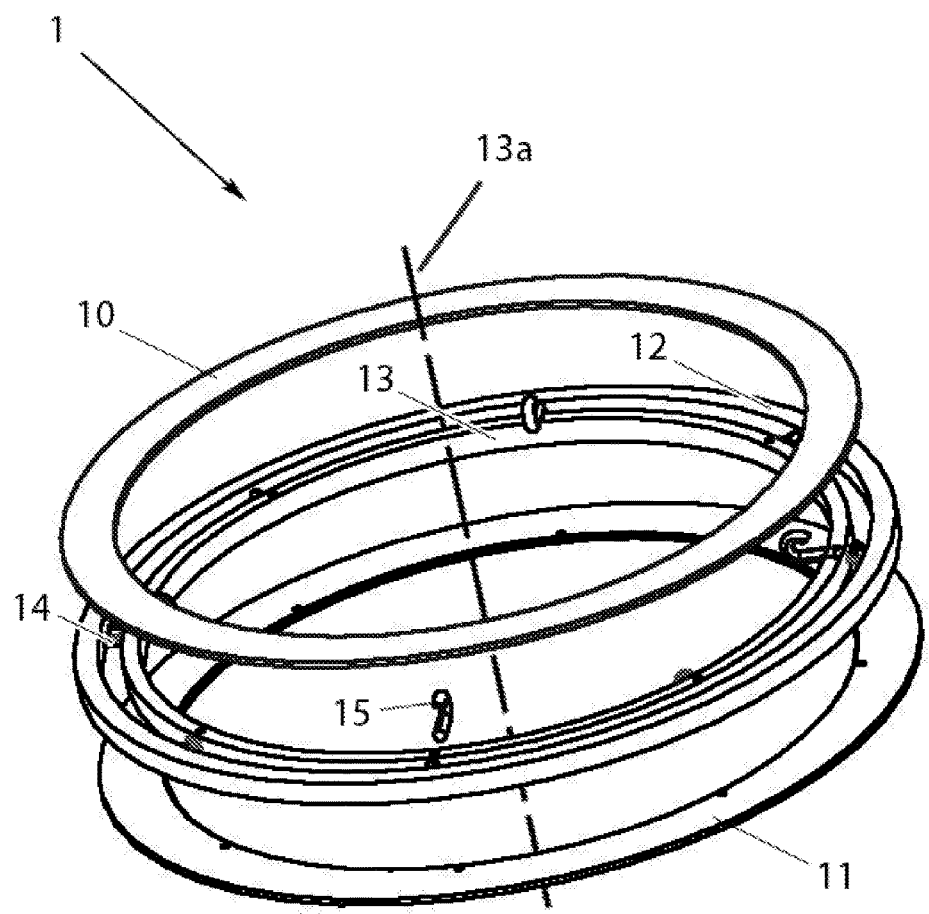
FIG. 3 shows an exploded view of the annular construction formed by the annular parts.

FIG. 3 shows an exploded view of the ring construction 1. The following items are emphasised: the inner ring 13 to which an upper disc 10 and a bottom disc 11 are attached, the ball bearings 14, the attachment apparatus 15 in form of hooks for attaching the person 25, and the outer ring 12. The ball bearings are arranged in the annular cavity formed by the rings 12, 13 and the discs 10, 11.

Figure 4:
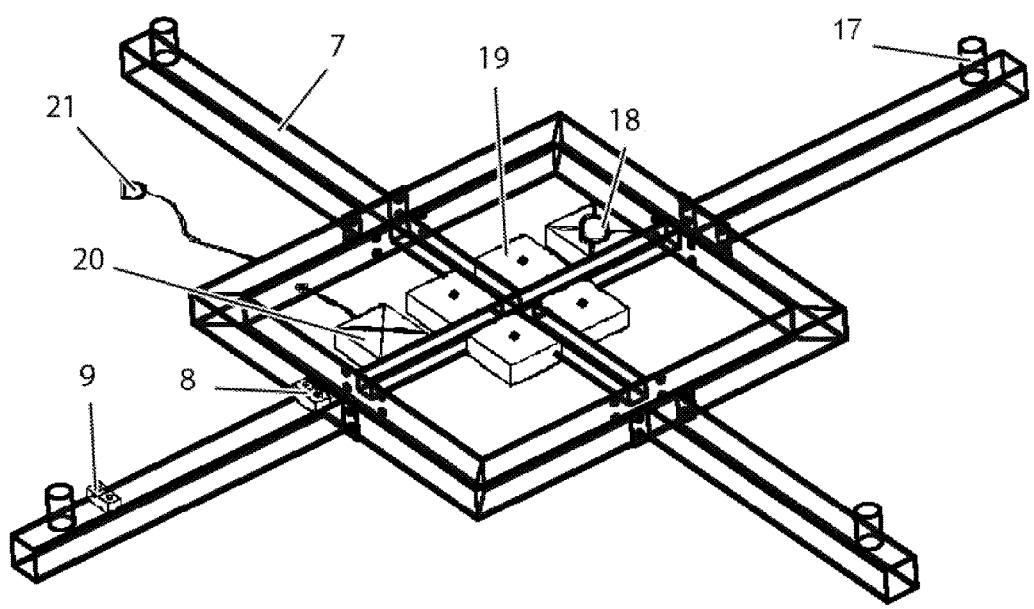
FIG. 4 shows the base frame without the platform.

FIG. 4 shows the base frame 7 without the attached base platform. The base platform is screwed onto the base frame 7 and comprises holes for the optical sensors which measure the movement of the feet. The following items are emphasised: the base frame 7, the optical distance sensor 8 for measuring the height of the spiral 3, the optical distance sensor 9 for measuring the height of the ring construction 1, the optical sensors 19 for measuring the movement of the feet, a USB Hub 18 which transmits the signals of the optical sensors 19 to a microcontroller 20, a USB cable 21 for connecting the apparatus to a computer 22.

Figure 5:
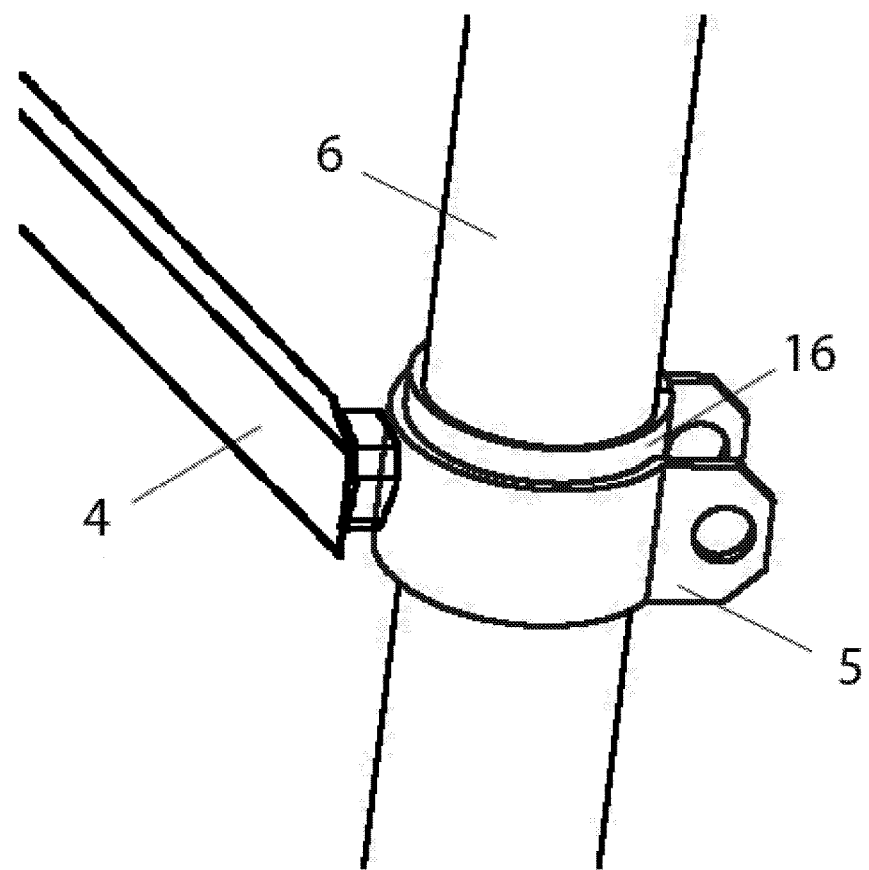
FIG. 5 shows the fastening of the connecting rods with the tube retainers.

FIG. 5 shows the connecting rods which are connected via a screw to the tube retainers 5. Said tube retainers 5 fix the slide bushings 16 to the vertical sliding rods 6. The following items are emphasised here: the connecting rod or rod assembly 4, the tube retainer 5, the slide bushing 16 and the sliding rod 6.

Figure 6:
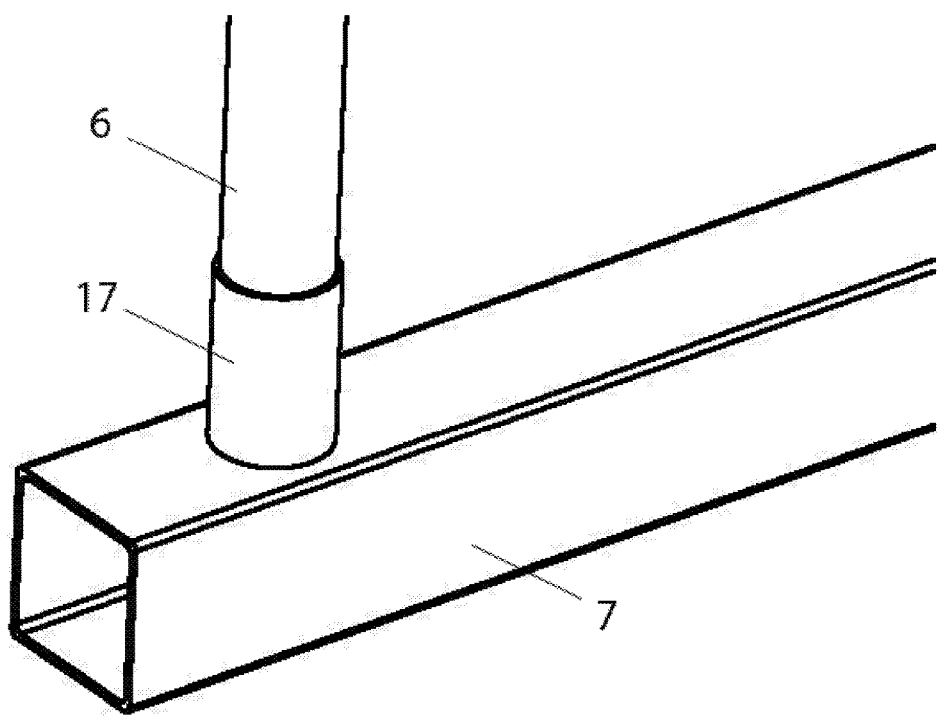
FIG. 6 shows the fastening of the sliding rods with the bushings of the base frame.

FIG. 6 shows the fastening of the sliding rods 6 to the base frame 7. The sliding rods 6 are inserted into the bushings or sleeves 17 which are welded onto the base frame 7 and are additionally fixed by a screw there. The following items are emphasised: the sliding rod 6, the bushing or sleeve 17, the base frame 7.

Figure 7:
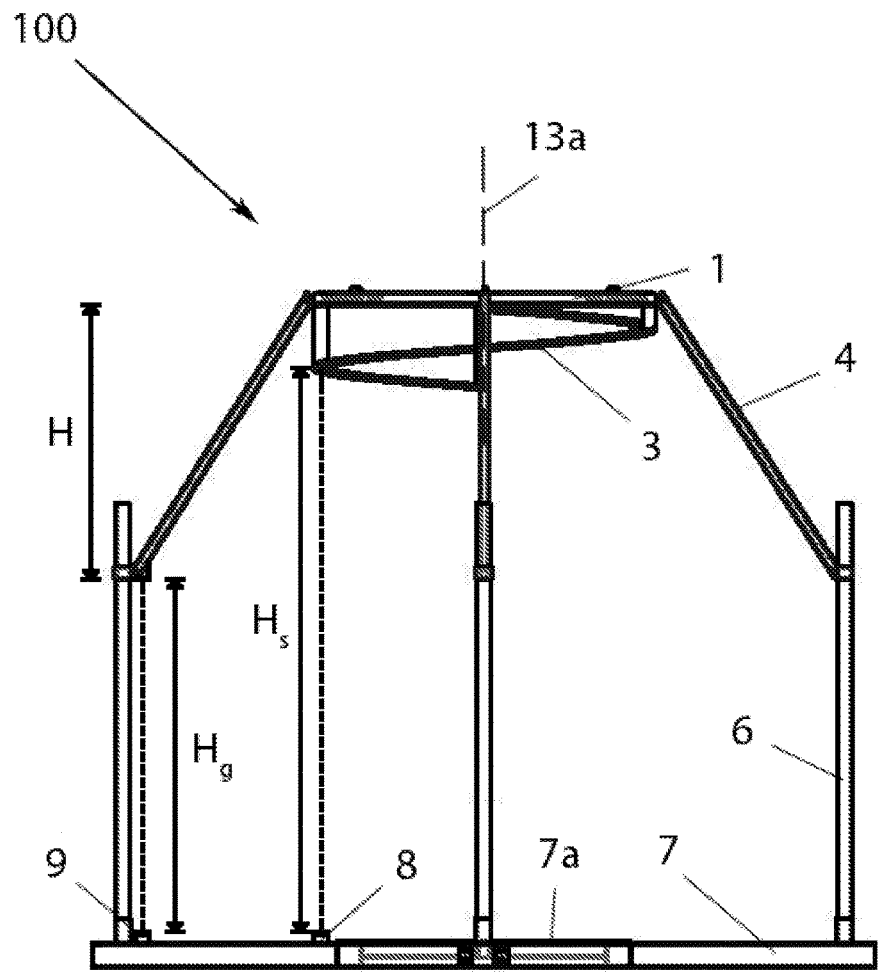
FIG. 7 shows the apparatus in accordance with the invention from the side.

FIG. 7 shows the apparatus 100 from the side and the measuring beams of the sensors which measure the height of the ring construction 1 and the height to the spiral 3. The following items are emphasised here: the ring construction 1, the spiral 3, the connecting rods 4, the sliding rods 6, the base frame 7, the optical distance sensor 8 for measuring the height to the spiral, the optical distance sensor 9 for measuring the height of the ring construction 1.

A detailed description of said embodiment is provided below:

The apparatus 100 consists of a (special) harness 23, a platform 7a and a ring construction 1, which are preferably connected to each other via slide bushings and/or hooks.

Base Platform:

The base platform comprises a base frame 7, a base plate 2 and the electronic system of the apparatus 100. The base plate 2 which forms the platform 7a consists of square stainless flat steel having four small holes. The diameter of said holes is preferably approximately 4 mm, which is just large enough that the sensors beneath said the plate can recognise the feet of the person 25. The arrangement of said holes is square at a distance of approximately 130 mm, so that at least one foot will always be recognised in each direction of movement. In order to ensure that the friction coefficient between the plate and the footgear of the user is reduced, the plate is further sprayed with a PTFE spray. The plate is screwed onto the base frame 7 at the corners by means of screws. The base frame 7 consists of square shaped tubes of equal length made of steel which are welded onto each other in a square. In order to ensure that the base plate does not cave in excessively, shaped tubes are additionally provided in the centre of the square base frame 7. Said shaped tubes are arranged like a cross and centrally welded onto the inner side of the square base frame 7. Four additional, equally long shaped tubes are screwed centrally onto the exterior side of the shaped tubes of the square base frame 7. All upper sides of the shaped tubes of the base frame form a flat plane on the upper side. Short sleeves 17 are welded onto the four outer shaped tubes, which sleeves are oriented upwardly. Round steel tubes 7 are inserted into said four sleeves 17. Said tubes 6 are equally long and are additionally screwed onto the sleeves 17. Four optically functioning computer mice (e.g. from A4Tech; model N-350) arranged in a square are attached to the inner shaped tubes which are arranged like a cross. The bottom side of said computer mice is oriented upwardly and forms a flat surface together with the upper side of the base frame. The arrangement is adjusted in such a way that the optical light beam of the computer mice radiates through the holes of the base plate. In addition, a USB Hub 18 and a microcontroller 20 (e.g. Arduino microcontroller) are attached to the inner side of the base frame 7. The four computer mice are connected to the USB Hub 18, and the USB Hub 18 via a USB host shield to the microcontroller. Two optical distance measuring sensors 8, 9 (e.g. distance sensor GP 2 Y0A 02 YK Sharp) are situated on one of the four outer shaped tubes, which distance measuring sensors operate and evaluate by means of the triangulation principle. One of these sensors is attached shortly before the sleeve 17 in an upwardly oriented perpendicular manner, and the other one close to the connection of the shaped tube with the square frame. This sensor is also upwardly oriented in a perpendicular manner. These two sensors are also connected to the microcontroller. A USB cable is connected to the microcontroller 20 and said cable is then used for communication with the computer 22.

Ring Construction 1:

The ring construction 1 consists of an inner rotatable part 13 and an outer fixed part 12.

The inner rotatable part 13 preferably consists of an aluminium ring and two annular aluminium discs 10, 11. The inner diameter of the first or inner ring 13 and the inner diameter of the two annular discs 10, 11 are equally large. The outer diameter of the two discs 10, 11 is greater than that of the ring. The cross-section of the inner ring 13 is rectangular, wherein the shorter side is at the top and the bottom. The two discs 10, 11 are screwed onto the inner ring 13 at the top and the bottom. The outer part of the ring construction 1 consists of a second (outer) ring 12 on which fifteen ball bearings 14 are situated in the interior and square aluminium shaped tubes are fastened on the outside to four points. The cross-section of the outer ring 12 is preferably square, wherein the side length of the square is shorter than the vertical longer side of the cross-section of the inner ring 13. The inner radius of the outer ring 12 is greater by approximately 20 mm for example than the outer radius of the inner ring 13, so that ball bearings 14 with an outer diameter of 19 mm have space in the intermediate space of the rings 12, 13. Since the side length of the cross-section of the outer ring 12 is shorter than the side length of the long side of the cross-section of the inner ring 13, the outer ring 12 fits between the two discs 10, 11 which were screwed onto the inner ring 13.

A round steel bar is welded onto the inner side of the outer ring 12. Said round steel bar is used as a fixing for the ball bearing 14. The round steel bar is welded in three different ways, thus providing three possibilities for positioning the ball bearing 14. In the first type, the round steel bar is welded onto the inner side of the outer ring 12 in such a way that the axis of the ball bearing 14 is parallel to the axis of the rings 12, 13 and the ball bearing 14 touches the exterior side of the inner ring 13. This process is carried out at six points in a distributed manner over the entire circumference of the ring 12. This allows the rotation of the inner ring 13.

In order to ensure that the inner part 13 of the ring construction 1 is unable to move axially with respect to the outer part 12, the round steel bar is welded at nine points onto the inner side of the outer ring 12 in such a way that the axis of the attached ball bearing 14 is oriented radially perpendicularly to the axis of the outer ring 12. These points are also regularly distributed over the circumference. The round steel bar is welded onto the inner side of the outer ring 12 at six of these positions for example in such a way that the ball bearings 14 touch the bottom side of the upper disc 10, and a gap is situated between the disc 10 and the upper side of the outer ring 12 so that the disc 10 and the ring 12 do not touch each other. The round steel bar is welded at three of these positions for example in such a way that the ball bearings 14 touch the upper side of the bottom disc 11 and a gap is formed between the disc 11 and the ring 12 so that the disc 11 and the ring 12 also do not touch each other at the bottom.

The four square shaped tubes on the exterior side of the outer ring 12 are rigidly connected to the outer ring 12 by a screw. Said shaped tubes are downwardly inclined at an angle of approximately 45° and tube retainers 5 are screwed onto the outer ends of said shaped tubes. Said tube retainers 5 are attached to the four round steel tubes 6 of the base platform via a PTFE slide bushing 16. The tube retainers 5 press against the PTFE slide bushings 16, which on their part press against the round steel tubes 6. The friction between the PTFE slide bushings 16 and the steel tubes 6 can be varied by varying the pressing force of the tube retainers 5. The shaped tubes are precisely so long that a height from the bottom disc 11 of the inner part 13 of approximately 550 mm is produced in the bottommost layer of the ring construction 1 where the PTFE slide bushings 16 and the sleeves 17 touch each other.

Four hooks are screwed onto the inner side of the inner part 13 of the ring construction 1, which hooks are regularly distributed over the circumference and are used as an attachment apparatus. Said hooks are used for fixing the (special) harness 23. A spiral 3 (made of plastic for example) is situated on the bottom side of the bottom disc 11 of the inner part 13 of the ring construction 1, wherein the outer diameter of said spiral is as large as the diameter of the disc 11. The spiral 3 has precisely one winding and an offset of approximately 160 mm. The spiral 3 is screwed at four points onto the disc 11 by suitable collecting elements made of aluminium round steel.

The Special Harness:

The special harness consists of a conventional climbing harness on which four connecting belts 24 are additionally sewed. The length of said connecting belts 24 is variable and a steel ring is situated at their ends. The arrangement of the four connecting belts 24 is regularly distributed over the circumference of the harness 23. The (climbing) harness 23 comprises only one hip fixing and a leg fixing but no shoulder fixing. The harness 23 is put on for attaching the person 25 to the apparatus 100, the steel rings of the connecting belts 24 are attached to the respective hooks, and the length of the four connecting belts 24 which connect the harness 23 to the ring construction 1 are shortened in such a way that the connecting belts 24 are tightly tensioned. The connecting belts 24 can now absorb forces which are produced during the movement in the apparatus 100 by the user.

Measurement Technology:

In order to ensure that users of different body size can optimally use the apparatus 100, it is necessary to calibrate the device at first, especially the sensor device plus evaluation device.

Movements of the Feet:

If the user wishes to move on the base platform, the four tensioned connecting belts 24 will prevent the user from doing so, so that the feet of the user will begin to slide on the base plate. Since small holes are situated in said plate and the optical computer mice are arranged beneath, at least one foot will be recognised during sliding over said holes by the computer mice. The signals of the computer mice which have recorded the movements are transmitted to the microcontroller 20. It now calculates a direction and a velocity of the movement. These data are transmitted via a USB cable to the driver software of the computer 22.

The Position of the Inner Part 13 of the Ring Construction 1:

The outer distance sensor 9 on the base platform measures the distance from the shaped tube of the ring construction 1 which is connected to the tube retainer 5, and transmits the signal to the microcontroller 20. This signal is used to record jumping and crouching movements. These movements occur by axial upward and downward displacement of the ring construction 1. After the calibration, a specific height value is determined and it is recognised by comparing the value from the outer distance sensor 9 with the height value whether the user is crouching or jumping. The inner distance sensor 8 measures the distance from the spiral 3 and transmits the signal to the microcontroller 20.

The rotation of the inner part 13 of the ring construction 1 changes the distance between the inner distance sensor 8 and the spiral 3. As a result, the angle of the inner part 13 to the outer part 12 of the ring construction 1 can be measured absolutely. In order to optionally consider a measured value of the inner distance sensor 8 with respect to the spiral 3, which measured value was falsified as a result of the axial upward and downward movements of the ring construction 1, a difference is formed of the values between the two distance sensors 8, 9. It is thus ensured that every angle can be detected in each potential height position of the entire ring construction 1.

The microcontroller 20 transmits these values to the driver software on the computer 22. The driver software evaluates the data of the microcontroller 20 and then transmits the set commands to the software which are to be used together with the apparatus 100.

Figure 8:
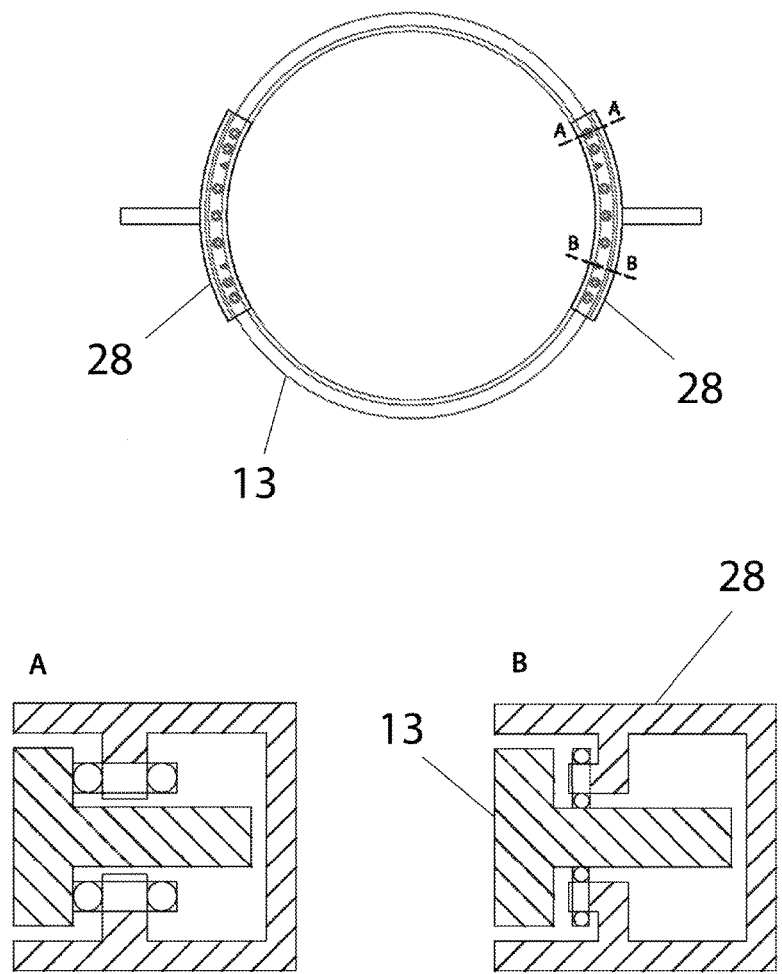
FIG. 8 shows an alternative embodiment of the invention.
Figure 9:
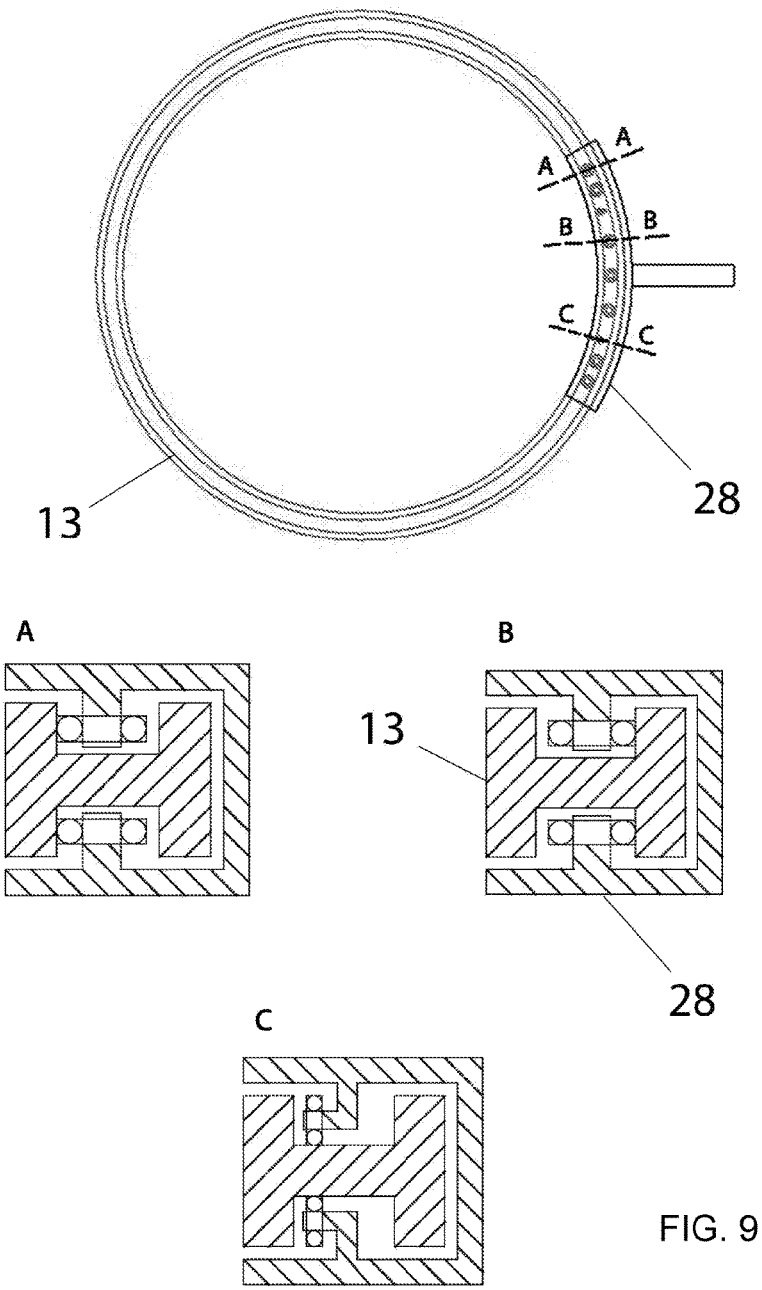
FIG. 9 shows a further alternative embodiment of the invention.

FIGS. 8 and 9 show alternative embodiments of the invention. Instead of a second (outer) ring, the first annular part 13 is retained by ring-segment-shaped parts 28 and is rotatably mounted.

FIG. 8 shows an embodiment with two ring-second-shaped parts 28 which are situated opposite of each other and accommodate the first annular part 13 between themselves. The cross-section of the first annular part 13 is T-shaped, whereas the cross-section of the ring-segment-shaped part 28 is U-shaped and surrounds the annular part 13.

Differently oriented bearings (section A-A and section B-B), i.e. with differently oriented axes, prevent or limit mutual displacement of the parts 13 and 28 in the axial direction and in the radial direction.

The plane formed by the first annular part 13 and the plane formed by the ring-second-shaped parts 28 stand substantially parallel with respect to each other, and the first annular part 13 is rotatably mounted on the ring-segment-shaped parts 28 about a rotational axis 13a, which stands substantially normal to the plane formed by the first annular part 13. In this case too, the ring-segment-shaped part 28 is torque-proof relative to the platform 7a and can be moved upwardly and downwardly together with the first annular part 13 (not shown in FIG. 8).

The first annular part 13 has an H-shaped cross-section in FIG. 9, and only one ring-segment-shaped part 28 is provided. As is shown in the sectional views A-A, B-B and C-C, three differently oriented bearings (i.e. with differently oriented axes) are necessary in order to prevent/limit the mutual displacement of the parts 13 and 28.

In order to prevent a rotation of the ring-segment-shaped part 28 of FIG. 9 with respect to the platform 7a even in only one (vertical) guide rod, an elongated groove can be introduced (milled) into the guide rod, which groove cooperates with a protrusion of a slide bushing (torque-proof) which protrudes into the groove. It would also be possible to provide a second guide rod, wherein the two associated slide bushings are rigidly connected to each other.

The advantages of the variants shown in FIGS. 8 and 9 especially consist of the savings in material and the resulting weight reduction for the user.

Reference is expressly made to the fact that the features disclosed with respect to the second annular part 12, especially its attachment to the platform 7a, also applies to the ring-segment-shaped part 28 and can also be applied in an analogous fashion.

Figure 10:
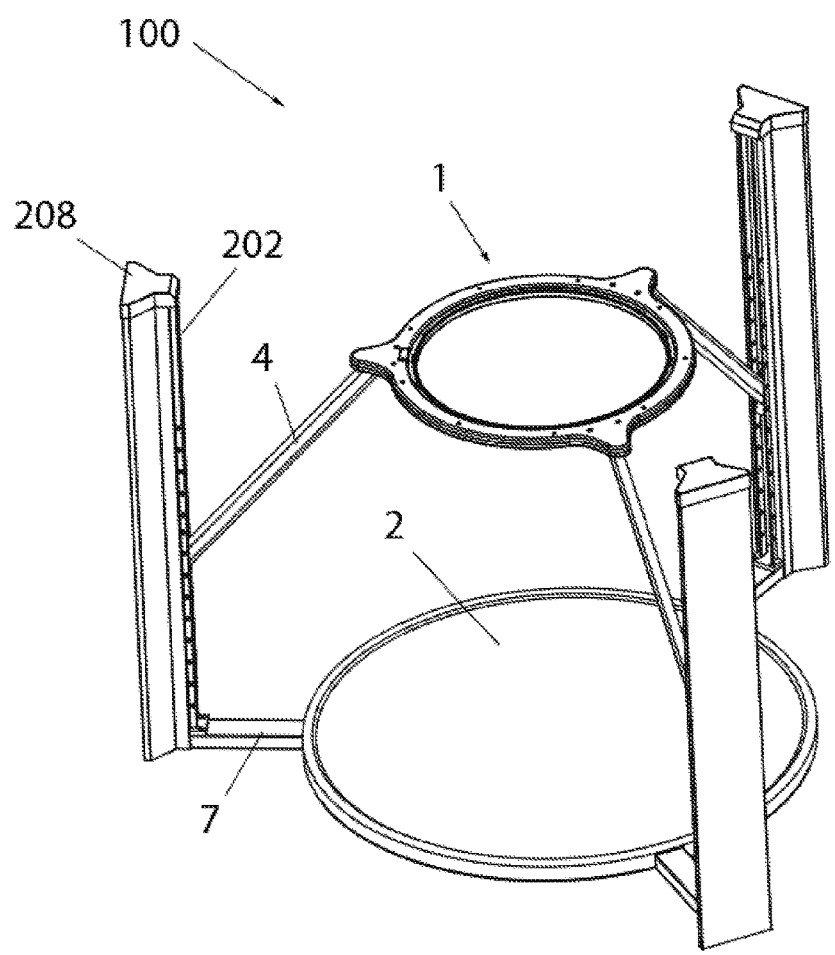
FIG. 10 shows a further alternative embodiment of the invention in an axonometric view obliquely from above.

FIG. 10 shows a further embodiment of the apparatus 100 in accordance with the invention, wherein guide profiles 202, preferably made of aluminium, are used as elongated guides instead of the sliding rods 6. In summary, the rod assembly 4 which connects the ring construction 1 to the guide structures comprises three connecting rods, and three guide profiles 202 are accordingly provided. The three guide profiles 202 stand vertically and are fixed to the base frame 7, wherein the base frame 7 is formed in this case from shaped tubes made of steel, which are arranged in triangular form with respect to each other—see FIG. 13 which shows an axonometric view of the apparatus 100 of FIG. 10 obliquely from below.

Figure 11:
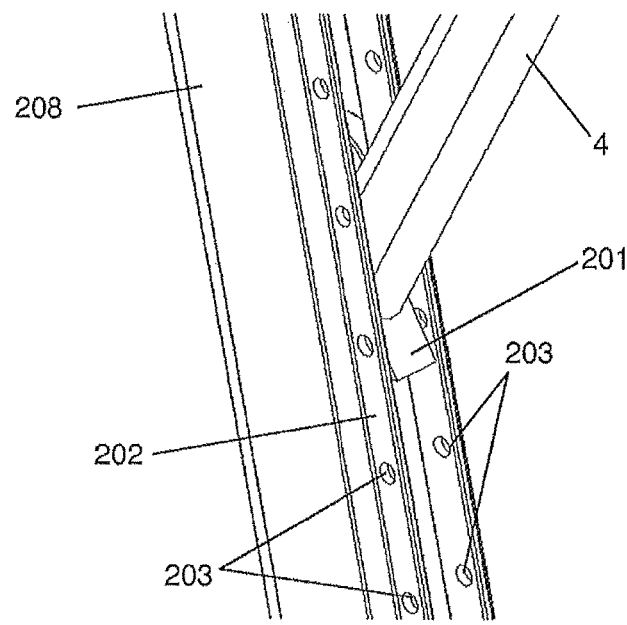
FIG. 11 shows a detailed view with an elongated guide of the embodiment of FIG. 10.

In order to improve the visual appearance, the guide profiles 202 are lined with a housing 208 made of plastic, which is adapted to the cross-section of the guide profiles 202. FIG. 11 shows a detailed view of a guide profile 202 with a block 201 which is guided therein and which is arranged at the end of a connecting rod of the rod assembly 4. The shape of the block 201 is adjusted to the cross-section of the hollow profile 214 of the guide profile 202. The block 201 can move upwardly and downwardly in the guide profile 202. As is shown in FIG. 11, the guide profile 202 comprises holes 203 through which a pin or a bolt (not shown) can be guided in order to limit the movement of the block 201, especially downwardly. This means that the pin/bolt and the holes 203 form a blocking means in order to block the vertical movement of the ring construction 1. The position of the block 201 in the guide profile 202 and thus the vertical position of the ring construction can substantially be fixed (apart from a specific amount of play) in that two pins/bolts are inserted into the holes 203 directly beneath and above the block 201.

Figure 12:
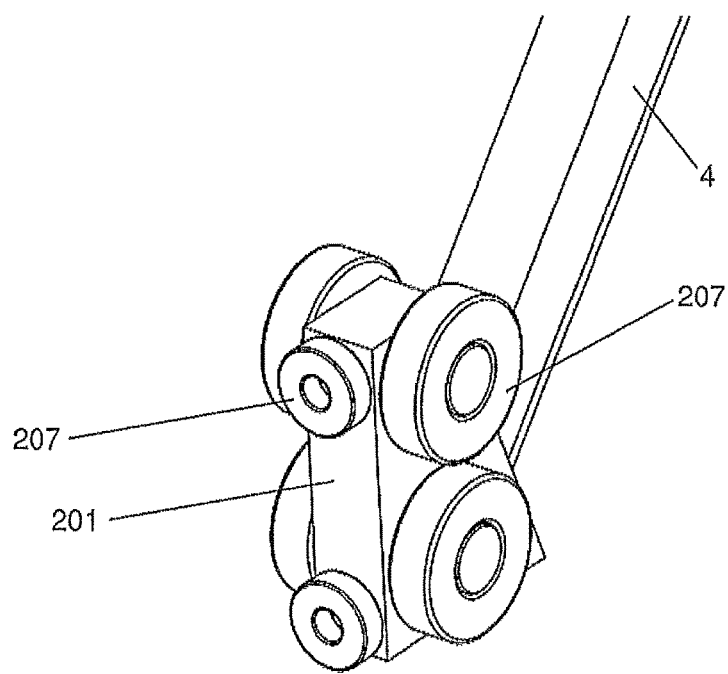
FIG. 12 shows a detailed view of a guide structure of the embodiment of FIG. 10.

The block 201 is shown in detail in FIG. 12. The block 201 comprises rollers 207 which are mounted by ball bearings in order to enable the most friction-free movement in the guide profile 202. The dimensions of the block 201 or rollers 207 are chosen in such a way that each roller 207 never touches two opposite walls of the hollow profile 214 of the guide profile 202 simultaneously, thus excluding inadvertent blockage of the upward and downward movement.

Figure 13:
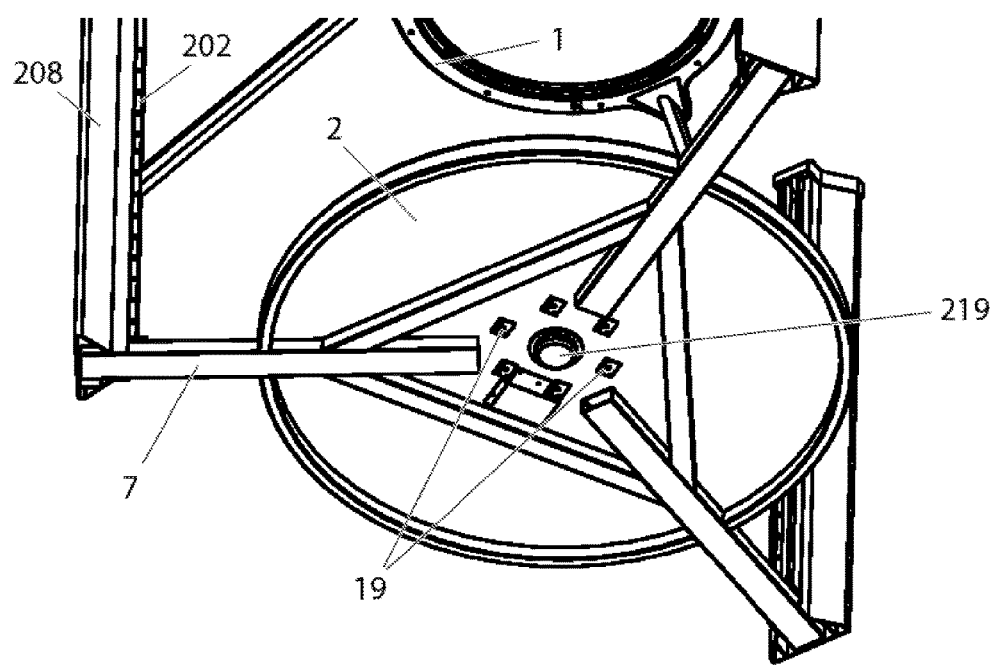
FIG. 13 shows the embodiment of FIG. 10 in an axonometric view obliquely from below.

The view of FIG. 13 shows a preferred arrangement of the (laser gaming) sensors 19 in form of a hexagon, which ensures that each movement of the feet of the person 25 in each rotational direction is recognised by at least one sensor 19. Furthermore, a vibration unit 219 is shown which is arranged in the centre between the sensors 19 on the platform 7a and enables shaking of the platform 7a. Force feedback for the person 25 can thus especially be generated.

Figure 14:
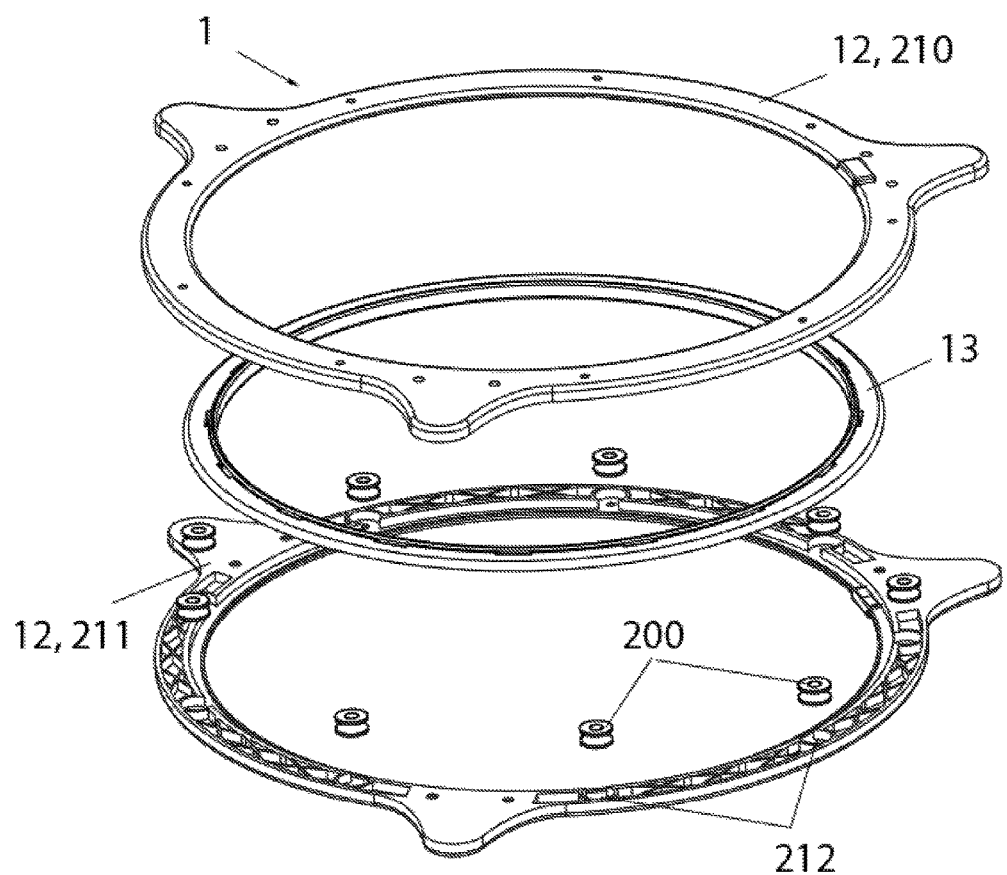
FIG. 14 shows an exploded view of the annular construction of the embodiment of FIG. 10, which construction is formed by the annular parts.

FIG. 14 shows a further development variant of the ring construction 1. The second annular part 12 consists in this case of an upper part 210 and a bottom part 211, wherein the two parts 210, 211 are arranged identically in a preferred embodiment. The parts 210, 211 preferably consist of hard plastic. The parts 210, 211 comprise recesses 212 for accommodating and bearing deflection rollers 200, which recesses are distributed over the circumference. Said deflection rollers 200 have a specific shape on their circumference, e.g. a U-shape or a V-shape. The first annular part 13 has a shape which corresponds to the deflection rollers 200 on its outer circumference. The deflection rollers 200 are inserted with the first annular part 13 into one of the parts 211, 210, preferably the bottom part 211, whereupon the other part 210, 211, preferably the upper part 210, is placed thereon, thus forming the second annular part 12. The shape of the deflection rollers 200 blocks an axial movement of the first annular part 13 in relation to the second annular part 12 on the one hand, and the rotation of the first annual part 13 in the second annular part 12 is enabled on the other hand.

Figure 15:
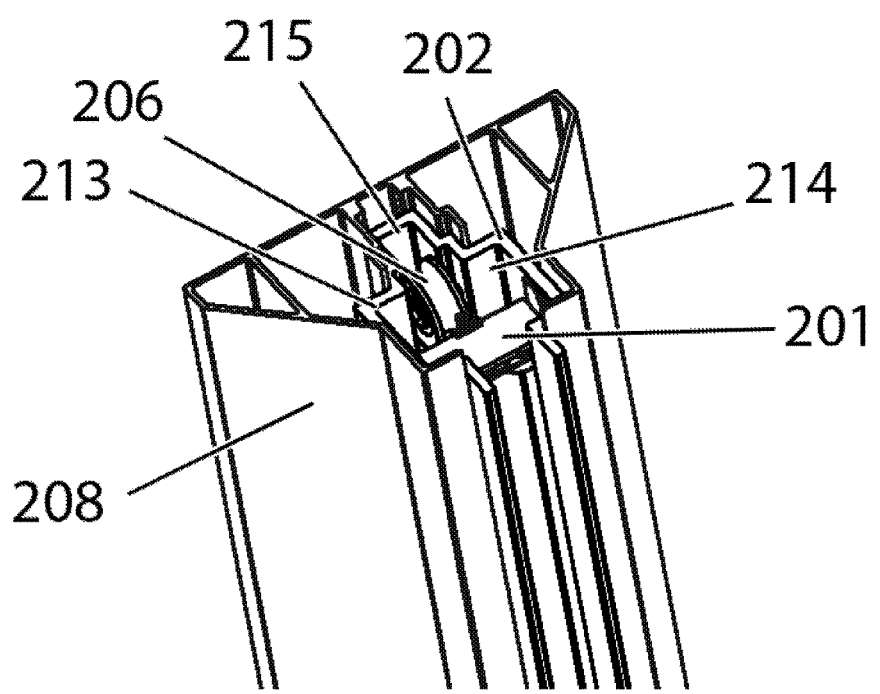
FIG. 15 shows a detailed view of the upper end of the elongated guide of the embodiment of FIG. 10.

FIG. 15 shows a detailed view of the upper end 213 of a guide profile 202, wherein the upper end 213 is free and is not covered by the housing 208. It can be recognised that a channel 215 is formed in the guide profile 202 or in the hollow profile 214 in which a deflection roller 206 is mounted. Said deflection roller 206 is used for the deflection of a cable 205 which is connected at one end to the block 201 and at the other end to a compensation means in form of counterweight, a spring element or a rubber element 204. As a result, the weight can be compensated which acts as a result of construction on the ring construction 1, especially the first annular part 13, and which would thus pull the user 25 in the downward direction.

Figure 16:
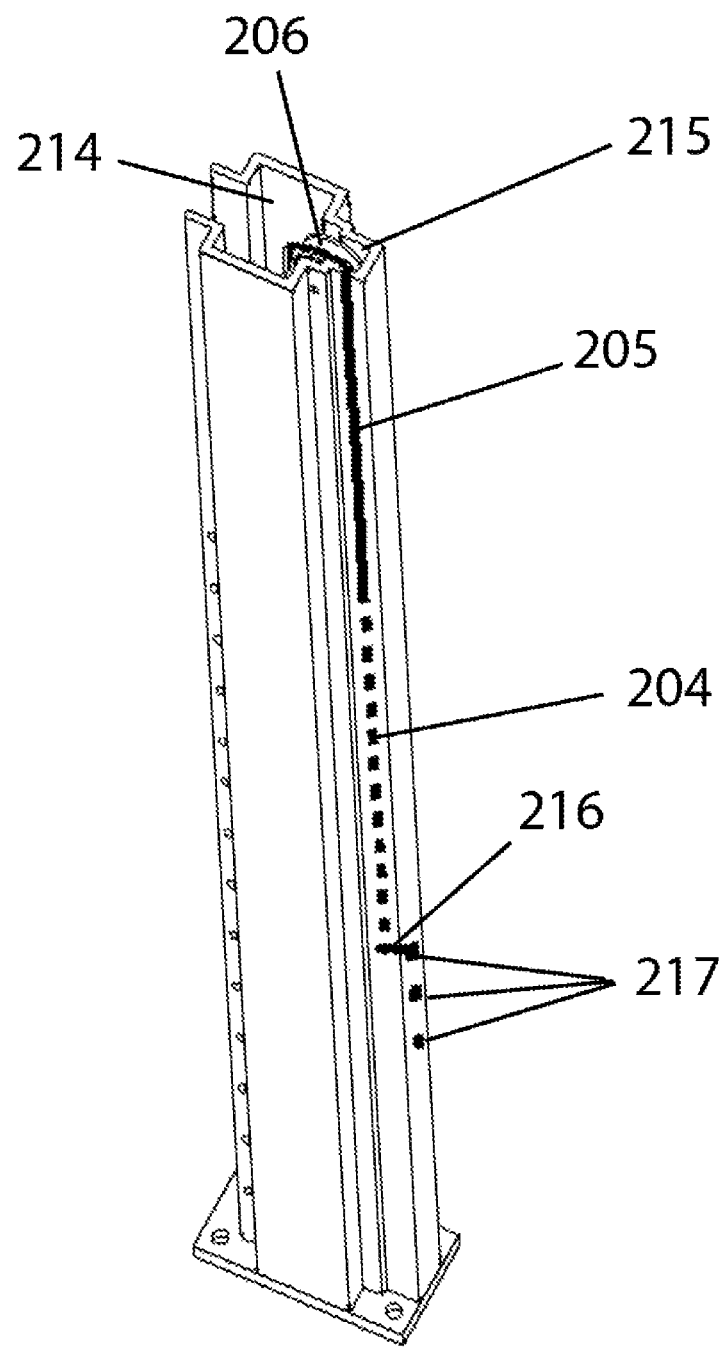
FIG. 16 shows an elongated guide of the embodiment of FIG. 10 without the housing.

FIG. 16 shows a development variant in this respect in which a rubber element 204 (shown with the dotted line) is used as a compensation means, which element is connected at one end to the cable 205 and fastened at the other end to the guide profile 202. The channel 15 is shown in a transparent way for illustration purposes in FIG. 16, so that the rubber element 204 can be recognised. Its fastening to the guide profile 202 occurs by means of a fastening element 216 which can be fixed to several fastening positions 217. This allows setting the pretensioning of the rubber element 204 in such a way that the weight acting on the ring construction 1 as a result of the construction is compensated only partly or completely, or is overcompensated. Accordingly, the person 25 would perceive a specific light force when using the apparatus 100 which pulls the ring construction 1 (and thus the person 25) in the downward direction, or the person 25 would not perceive any force acting in the vertical direction, or the person would perceive a specific light force which presses the ring construction 1 (and thus the person 25) in the upward direction. The fastening element 216 can be arranged as an element that can be screwed, and the fastening positions 217 can be provided with respective threads. The fastening element 216 can alternatively be arranged as a hook, and the fastening positions 217 can be formed with respective eyes or openings into which the hooks can be hooked.

Figure 17:
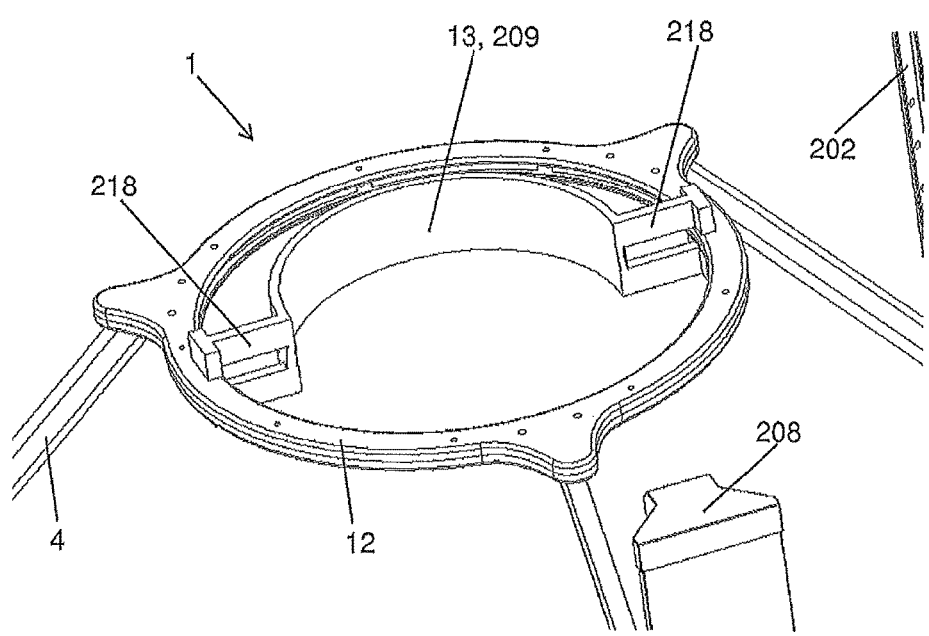
FIG. 17 shows a ring construction of a further embodiment.

FIG. 17 shows a further embodiment of the ring construction 1, in which the first annular part 13 itself forms a hip belt for the person 25. The first annular part 13 comprises a rigid first part 209 which in the plane formed by the first annular part 13 is substantially U-shaped, wherein an arm 218 protrudes from each end of the U. The arms 218 are also provided on their part with a U-shape, but in a plane which stands normal to the plane which is formed by the first annular part 13. As a result, each arm 218 can accommodate the second annular part 12, and the first rigid part 209 can be twisted relative to the second annular part 12. In addition, guides can be provided on the second annular part 12 and the arms 218, e.g. in form of a groove in the second annular part 12 into which a lug engages which is integrally attached to the respective arm 218 (not shown), in order to ensure an especially precise guidance of the first rigid part 209 during rotations. At the same time, an axial movement of the first rigid part 209 is blocked relative to the second annular part 12 by the arms 218. A second flexible part (not shown) is fastened to the first rigid part 209, which second flexible part allows an adjustment and fixing of the hip belt thus formed to the person 25.

The described apparatuses merely represent a number of potential variants of the invention. The invention is not limited to the described embodiments and the aspects emphasised therein. A large number of modifications are rather possible within the inventive concept, which modifications lie within the scope of actions carried out by the persons skilled in the art. It is similarly possible to realise further development variants by combination of the aforementioned means and features without leaving the scope of the invention.

The invention claimed is:

1. An apparatus for accommodating at least one person and for partially limiting the freedom of movement of the person accommodated in the apparatus, comprising a platform and a first annular part arranged above the platform for surrounding the at least one person, wherein the first annular part is indirectly connected to the platform and is rotatable relative to the platform, wherein the first annular part can be moved up and down in relation to the platform, wherein further the apparatus comprises a second annular part, wherein a plane formed by the first annular part and a plane formed by the second annular part stand substantially parallel with respect to each other, and the first annular part is arranged within the second annular part and is rotatably mounted thereon about a rotational axis which stands substantially normal to the plane formed by the first annular part, wherein further a rod assembly is fastened to the second annular part at least at one point, which rod assembly extends downwardly in an inclined manner in relation to the plane formed by the second annular part, and wherein the rod assembly comprises a guide structure at its outer end, which guide structure is guided on an elongated vertical guide.

2. The apparatus according to claim 1, wherein the apparatus comprises at least one sensor device for the detection of the movement and/or the sequence of movement and/or the extent of movement of the person accommodated by the apparatus.

3. The apparatus according to claim 1, wherein deflection rollers are arranged on the second annular part, and wherein the deflection rollers and the first annular part are formed with respect to each other in such a way that the first annular part is rotatably mounted via the deflection rollers in relation to the second annular part and is simultaneously axially retained.

4. The apparatus according to claim 1, wherein at least one blocker is provided in order to block a movement of the guide structure in the elongated vertical guide.

5. The apparatus according to claim 1, wherein at least one compensator is provided in order to compensate at least in part the weight which acts as a result of the construction of the apparatus on the first annular part.

6. The apparatus according to claim 5, wherein the at least one compensator comprises a counterweight, a spring element or a rubber element.

7. The apparatus according to claim 5, wherein the rod assembly is operatively connected via a cable to the at least one compensator, and
wherein the cable is deflected via a deflection roller arranged on the elongated vertical guide.

8. The apparatus according to claim 1, wherein the platform is formed by a steel plate and a plastic plate which is situated above said steel plate.

9. The apparatus according to claim 8, wherein the plastic plate is made of PE-HMW or PE-HD.

10. The apparatus according to claim 8, wherein the steel plate is screwed onto a base frame and the plastic plate is connected to the steel plate.

11. The apparatus according to claim 10, wherein the plastic plate is screwed or glued onto the steel plate.

12. The apparatus according to claim 1, wherein the platform comprises holes for the passage of light beams of optical sensors.

13. The apparatus according to claim 1, wherein the apparatus comprises a footgear for the person accommodated by the apparatus, which footgear, in interaction with the platform, has a sliding friction coefficient $\mu_G$, wherein $\mu_G \leq 0.07$ applies.

14. The apparatus according to claim 13, wherein $0.01 \leq \mu_G \leq 0.02$ applies.

15. The apparatus according to claim 1, wherein the apparatus comprises a vibration unit and/or a spatial movement machine.

16. The apparatus according to claim 15, wherein the vibration unit and/or the spatial movement machine are arranged on the platform.

17. The apparatus according to claim 2, wherein the sensor device comprises at least one optical sensor which is arranged beneath the platform.

18. The apparatus according to claim 17, wherein the optical sensor is an optically functioning computer mouse which is oriented upwardly with its bottom side.

19. The apparatus according to claim 2, wherein the sensor device comprises a plurality of optical sensors arranged in such a way that each movement of the feet of the person can be recognized in any rotational direction by at least one respective optical sensor of the plurality of optical sensors.

20. The apparatus according to claim 19, wherein the optical sensors are arranged in the form of a hexagon.

21. The apparatus according to claim 19, wherein the sensor signal is transmitted to a microcontroller.

22. The apparatus according to claim 21, wherein the sensor signal is transmitted via a USB hub and a USB host shield to the microcontroller.

23. The apparatus according to claim 2, wherein the sensor device comprises distance sensors, which are arranged in the region of the platform and are formed to measure the height of the annular parts and/or the rotational angle of the first annular part relative to the second annular part.

24. The apparatus according to claim 23, wherein the distance sensors are optical or acoustic distance sensors.

25. The apparatus according to claim 2, wherein the sensor device comprises distance sensors which are arranged in the region of the guide and are formed to measure the height of the annular parts.

26. The apparatus according to claim 25, wherein the distance sensors are optical or acoustic distance sensors.

27. The apparatus according to claim 2, wherein the sensor device comprises sensors which are arranged in the region of the second annular part and are formed to measure the direction of rotation and the rotational angle of the first annular part.

28. The apparatus according to claim 27, wherein the sensors are optical sensors.

29. The apparatus according to claim 2, wherein the apparatus for evaluating the sensor signals comprises at least one microcontroller which is connected to the at least one sensor device.

30. The apparatus according to claim 29, wherein the apparatus comprises a data-processing device which is connected to the microcontroller.

31. The apparatus according to claim 30, wherein the data-processing device is a computer.

32. An apparatus for accommodating at least one person and for partially limiting the freedom of movement of the person accommodated in the apparatus, the apparatus comprising
a platform,
a first annular part arranged above the platform for surrounding the at least one person, the first annular part being indirectly connected to the platform and being rotatable relative to the platform, the first annular part being movable up and down in relation to the platform,
at least one ring-segment-shaped part, and
a rod assembly fastened to the at least one ring-segment-shaped part at least at one point, which rod assembly extends downwardly in an inclined manner in relation to a plane formed by the at least one ring-segment-shaped part, the rod assembly comprising a guide structure at its outer end, the guide structure being guided on an elongated vertical guide,
  wherein a plane formed by the first annular part and the plane formed by the at least one ring-segment-shaped part stand substantially parallel with respect to each other, and the first annular part is rotatably mounted on the at least one ring-segment-shaped part about a rotational axis which stands substantially normal to the plane formed by the first annular part.

33. The apparatus according to claim 32, wherein the ring-segment-shaped part is torque-proof relative to the platform.

34. The apparatus according to claim 32, wherein the first annular part is mounted on two ring-segment-shaped parts, and
  wherein the ring-segment-shaped parts are situated opposite of each other.

35. The apparatus according to claim 32, wherein the at least one ring-segment-shaped part has a U-shaped cross-section, and the first annular part is surrounded at least partly by the U-shape of the ring-segment-shaped part.

36. The apparatus according to claim 32, wherein bearings between the first annular part and the at least one ring-segment-shaped part prevent or at least limit a mutual displacement in the axial direction and in the radial direction.

37. The apparatus according to claim 36, wherein the bearings are ball bearings.

38. The apparatus according to claim 1, wherein the first annular part comprises a first rigid part and a second flexible part, and
  wherein the first part and the second part form a hip belt for the person.

* * * * *